United States Patent [19]

Swain et al.

[11] Patent Number: 4,707,135
[45] Date of Patent: Nov. 17, 1987

[54] APPARATUS AND METHOD FOR THE RECORDING AND READOUT OF MULTIPLE EXPOSURE HOLOGRAMS

[75] Inventors: David M. Swain, Thousand Oaks, Calif.; Richard J. Tansey, Boxford, Mass.

[73] Assignee: Rockwell International Corporation, El Segundo, Calif.

[21] Appl. No.: 818,525

[22] Filed: Jan. 10, 1986

[51] Int. Cl.$^4$ .............................................. G01B 9/025
[52] U.S. Cl. .................................... 356/347; 356/349; 356/351
[58] Field of Search ....................... 356/35.5, 347, 348, 356/349, 351; 350/3.67; 73/655, 656, 657

[56] References Cited

U.S. PATENT DOCUMENTS

| | | | |
|---|---|---|---|
| 3,934,461 | 1/1976 | Heflinger et al. | 73/71.3 |
| 4,084,427 | 4/1978 | Jacoby et al. | 73/88 A |
| 4,188,122 | 2/1980 | Massie et al. | 356/349 |
| 4,428,675 | 1/1984 | Witherow | 356/347 |

OTHER PUBLICATIONS

Ineichen et al., "Vibration Analysis by Stroboscopic, Two-Reference-Beam Heterodyne Holographic Interferometry", Proc. SPIE, vol. 210, pp. 207–212, 1979.
Farrell et al., "Heterodyne Holographic Interferometry: Concentration and Temperature Measurements in Gas Mixtures", Applied Optics, vol 21, No. 9, pp. 1624–1627, May 1982.
Armstrong, W. T. and Forman, P. R., "Double-Pulsed Time Differential Holographic Interferometry", Applied Optics, Jan. 1977, vol. 16, No. 1., pp. 229–232.
Trolinger, J. D., "Application of Generalized Phase Control During Reconstruction to Flow Visualization Holography", Applied Optics, vol. 18, No. 6, Mar. 1979, pp. 766–774.

Primary Examiner—Davis L. Willis
Assistant Examiner—Matthew W. Koren
Attorney, Agent, or Firm—H. Fredrick Hamann; Hary B. Field; Lawrence N. Ginsberg

[57] ABSTRACT

An apparatus 10 and method for the recording and readout of multiple exposure holograms. For recording, the plane of polarization of the multiple pulsed linearly polarized laser beam 14 from source 12 is rotated by half-wave plate 26. Polarizing beam splitter 20 then divides the beam 14 into a test beam 24 and a recording reference beam 22. The test beam 24 is directed through a quarter-wave plate 28, through a test medium in chamber 34, reflected from mirror 36, back to beam splitter 20 and finally to film plate 37. On a first pulse, a first recording reference beam 22, 22' is directed through pockel cell 38, is reflected by beam splitter 40, through half-wave plate 76, off of mirror 42 and finally to film plate 37 to form a first hologram. On a second pulse a second recording reference beam 22, 22'' is transmitted through beam splitter 40, reflected off mirror 48 and 50 and through half-wave plate 46, and finally directed toward film plate 37 forming a second hologram. For readout, a continuous wave readout laser beam 54 directs beam 56 through a half-wave plate 62 and then off mirror 55 toward beam splitter 60. The resulting readout reference beams 56, 58 are then frequency modulated by Bragg cells 64, 66 recombined at beam splitter 72, redivided by beam splitter 40 and directed along the same paths as the recording reference beams 22', 22''. Half-wave plates 46 and 76 adjust the readout reference beams to have the same plane of polarization as each other thereby producing a frequency modulated interference pattern on an interference plane. The optical path differences between the recorded wavefronts at a reference location in the interference plane and another spatial located in the interference plane may then be measured.

30 Claims, 4 Drawing Figures

APPARATUS AND METHOD FOR THE RECORDING AND READOUT OF MULTIPLE EXPOSURE HOLOGRAMS

BACKGROUND OF THE INVENTION

1. Field of the Invention

This invention relates to multiple-exposure holographic interferometry and more particularly to a method and apparatus for the recording and readout of multiple exposure holograms utilizing heterodyne interferometry.

2. Description of the Prior Art

The application of multiple reference wave holographic interferometry to flow visualization and for determining deformation in objects has been documented in the literature (see, for example, an article by J. D. Trolinger entitled "Application of Generalized Phase Control During Reconstruction to Flow Visualization Holography" which appeared in *Applied Optics*, Mar. 15, 1979). This technique has been used as a diagnostic tool to study various flow fields including laser gas flows and the interactions of flows with airfoils. Typically, after a double pulse hologram is exposed and developed, an interferogram is produced from the two reconstructed wavefronts. Next, the interference fringes are digitized by determining the fringe center coordinates. For fringes with widely varying spacings across the interferogram, the digitization hardware can have difficulties locating fringe centers since video or solid-state image sensors have a fixed pixel size. This is particularly difficult for fringes with high spatial frequencies. Also, the digitization software tends to be complex since fringe centers must be located in the presence of varying contrast and in the presence of noise (speckle and diffraction artifacts). Another complication is the unraveling of fringe contours. For fringes that cannot be recognized by the software, an operator may have to manually determine the fringe centers.

U.S. Pat. No. 4,428,675, issued to Witherow, teaches a method for double-exposure holographic interferometry (test and reference beam pulses being formed) utilizing two lasers that sequentially output optical pulses with varying temporal spacing (10 nanoseconds or greater). The optical system is such that both reference beam pulses follow the same optical path. Thus, this method will not allow the two holograms to be addressed separately for readout.

U.S. Pat. No. 3,934,461, issued to Heflinger, teaches a method for recording multiple-exposure holograms with a double-pulsed laser using a single test beam path. In the reference path, both pulses follow the same beam path. The holograms are reconstructed with a continuous laser which is directed along the reference path. A pivoting mirror is utilized to direct either the pulsed laser beam toward a film path to record the holograms or the continuous laser to reconstruct the holograms toward the film plane. With the addition of the continuous laser, the hologram can be read out using the same optical system. Coincident recording reference beams for both holograms, as in Witherow, prevent the use of two reference beams during readout.

A method for producing two pulses from a single laser used in a double-pulsed holographic interferometer is described by W. T. Armstrong and P. R. Forman in the article entitled "Double-Pulsed Time Differential Interferometry" which appeared in *Applied Optics*, January 1977. In that paper the laser produces two pulses of orthogonal polarization and of varying time separation (100 nanoseconds or greater). The output beam is split into a test and reference beam, with the reference beam then being separated into two reference beams with a polarization sensitive Rochon prism. The Rochon prism introduces several milliradians of angular separation between the two beams.

The addition of this small tilt between the two recording reference beams allows tilt fringes to be viewed between the two holograms upon reconstruction. Such a hologram is read out with a single reference beam since the two recording reference beams do not have sufficiently large angular spacing. This prevents the recorded wavefronts stored in the holograms from being individually addressed with a phase or frequency modulated reference beam to allow for electronic phase readout.

OBJECTS OF THE INVENTION

A principal object of the invention therefore is to provide rapid recording and readout of wavefronts stored in a hologram.

Another object is to provide electronic phase readout of the wavefronts.

Another object is to provide multiple-exposure holograms formed with angularly separated reference beams to allow each wavefront to be independently reconstructed.

Other objects, advantages and novel features of the present invention will become apparent from the following detailed description of the invention when considered in conjunction with the accompanying drawing.

SUMMARY OF THE INVENTION

The present invention provides a method and apparatus for the recording and readout of multiple-exposure holograms. In its broadest aspects, the invention comprises producing a multiple pulsed linearly polarized laser beam. The multiple pulsed linearly polarized laser beam is divided into a test beam and a reference beam by a first polarizing beam splitter. The plane of polarization of the multiple pulsed linearly polarized laser beam being rotated prior to it being divided so that there is an intensity ratio between the test beam and the reference beam. The test beam is then directed toward a test medium and then to a recording medium. Prior to its incidence upon the test medium the test beam is circularly polarized for its ultimate efficient transmission to the recording medium.

At least a second polarizing beam splitter is provided for producing at least a first recording reference beam and a second recording reference beam being separated in time. These recording reference beams are produced after the plane of polarization is rapidly switched. Means are then provided for directing the first and second recording reference beams toward the recording medium at different angles. The plane of polarization of either the test beam or the recording reference beams is rotated to produce identical planes of polarization of the test beam and all recording reference beams so that at least two holograms are recorded and developed on the recording medium. Means are also provided for measuring the optical path differences between the recorded wavefronts stored in the holograms.

BRIEF DESCRIPTION OF THE DRAWING

The same elements or parts throughout the figures of the drawing are designated by the same reference characters, while equivalent elements bear a prime designation.

DETAILED DESCRIPTION OF THE INVENTION

Figure 1:
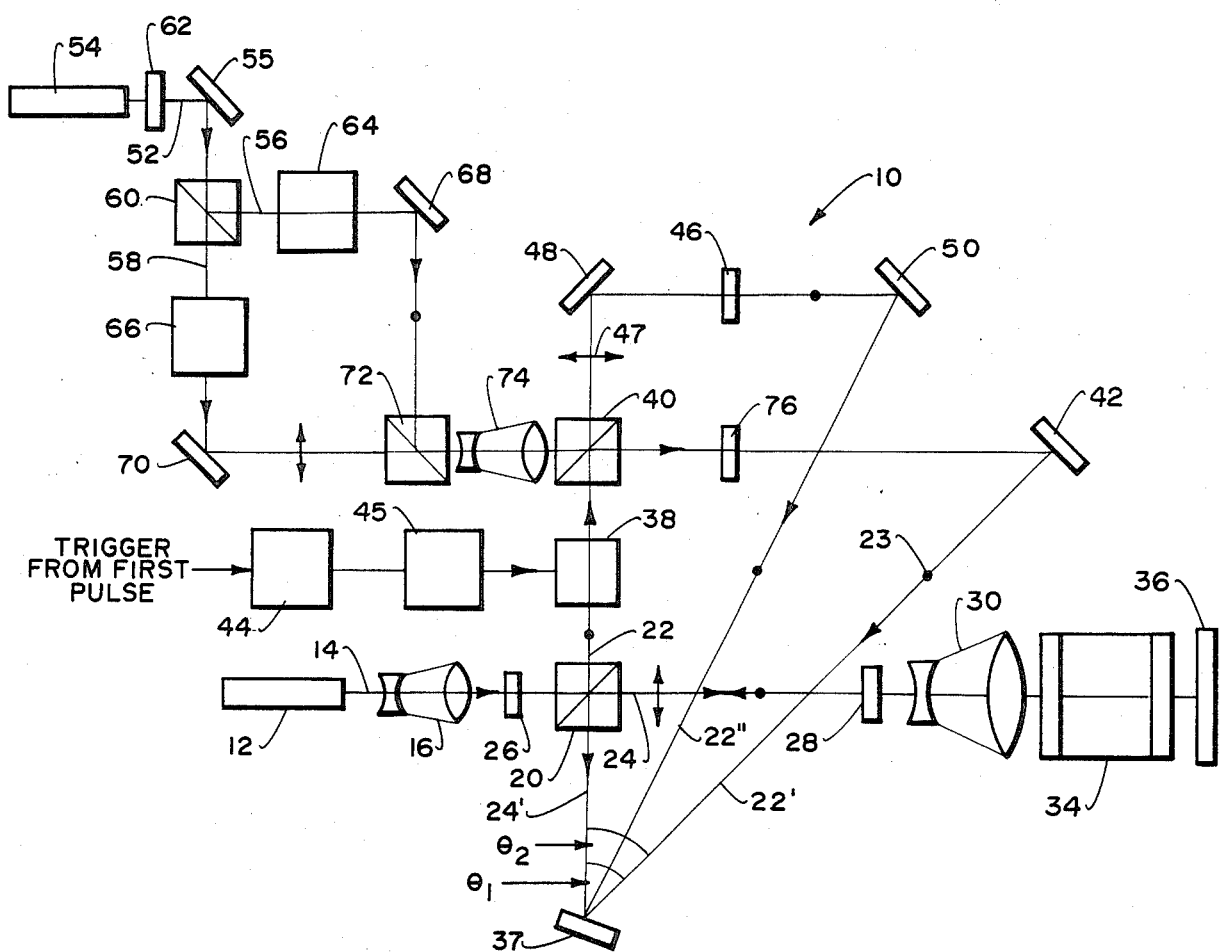
FIG. 1 is a schematic diagram of the apparatus of the invention.

Referring to FIG. 1, an apparatus 10 designates a preferred embodiment of the present invention for recording and reading out of multiple exposure holograms. Apparatus 10 includes a laser 12 for producing a multiple-pulsed linearly polarized laser beam 14. A double-pulsed ruby laser or frequency double Nd:YA laser may be utilized.

The first pulse from the laser 12 is expanded by a beam expander telescope 16 and divided by a polarizing beam splitter 20 into two orthogonally polarized beams—a reference beam 22 and a test beam 24. The intensity ratio between beams 22 and 24 is controlled by a half-wave plate 26 which rotates the plane of polarization of laser beam 14. The reference beam 22 is reflected from beam splitter 20, and the test beam 24 is transmitted through the beam splitter 20.

The outgoing test beam 24 is linearly polarized for both pulses. It is passed through a quarter-wave plate 28 and is thereby circularly polarized, e.g., in the counter-clockwise direction. Test beam 24 is then expanded by a beam expander telescope 30 to sample the medium in the test chamber 34 and is reflected by return mirror 36. Upon reflection, the beam 24 is circular polarized in the opposite direction, i.e., the clockwise direction. The quarter-wave plate 28 provides for efficient transmission of the test beam 24 to a recording medium such as a film plate 37. When beam passes through the quarter-wave plate 28 a second time, the plane of polarization is rotated 90° compared to the outgoing beam. Therefore, this test beam 24 is reflected by the polarizing beam splitter 20 onto the film plate 37 as test beam 24'.

It is understood that it is within the scope of this invention to use a solid test medium to reflect or scatter the test beam. In this context, the reflected or scattered test beam is collected with an optical system and relayed to the film plate to form a hologram. The modulation of the density of the developed hologram is controlled by rotating the half-wave plate 26.

The reference beam 22 from the first pulse is reflected from polarizing beam splitter 20 and is transmitted through a Pockel cell 38 having no applied voltage. The Pocket cell is used to select reference beam paths. Reference beam 22 is S-polarized, i.e., perpendicular to the plane of the paper. It is reflected as recording reference beam 22' by a second polarizing beam splitter 40 toward a mirror 42. (The fast axis of a half-wave plate 76 which is located between second polarizing beam splitter 40 and mirror 42 is aligned with the polarized beam and thus does not alter the polarization axis.) After reflection from mirror 42 the recording reference beam 22' is incident on a film plate 37 at an angle $\theta_1$, relative to the test beam 24'. The test beam 24' and recording reference beam 22' interfere and record a first hologram on film plate 37.

Figure 2:
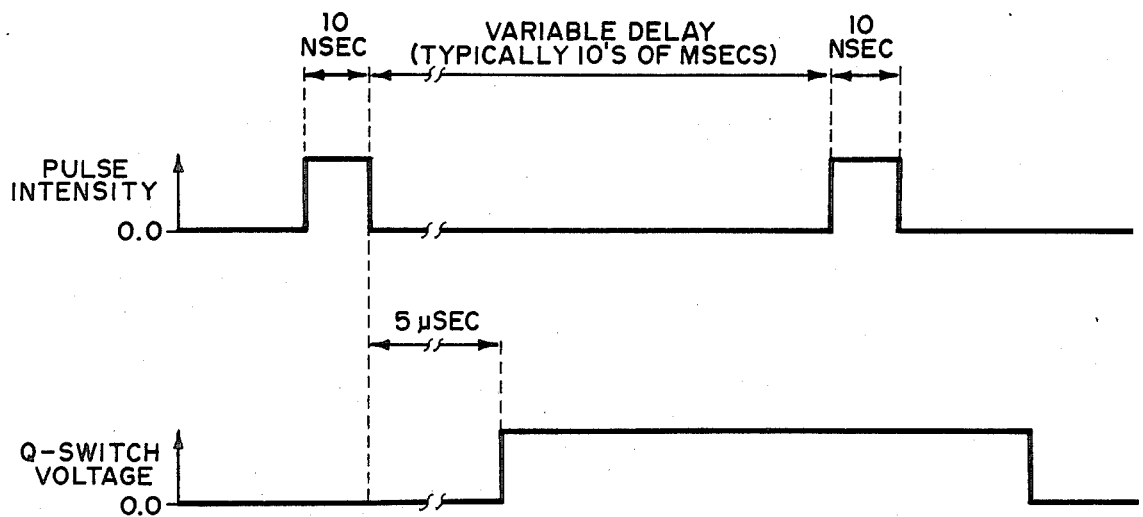
FIG. 2 is a timing diagram of the pulse intensity from the pulsed laser and the Q-switch voltage.

After the first hologram is recorded, a delay line sends a high voltage pulse triggered from the first laser pulse to a pulse delay generator 44 so that a Pockel cell driver 45 applies a half-wave voltage to the Pockel cell 38 and thus selectively and rapidly switches the Pockel cell polarization direction from S to P. The rise time for rotation of the plane of polarization by the Pockel cell 38 is extremely rapid, generally several nanoseconds. The time delay is selected to allow the first laser pulse to record the first hologram. This time can be variable but it typically several microseconds or greater. A timing diagram of the pulses and the Q-switch voltage is shown in FIG. 2. Pulse widths are not shown to scale.

Referring again to FIG. 1, the second laser pulse records another hologram with the test beam 24,24' following the same path as the first pulse. However, the recording reference beam 22" for the second pulse is transmitted (rather than reflected) through polarizing beam splitter 40, since it is now P-polarized, i.e., polarized in the plane of the paper (shown as a plane of polarization 47) by the Pockel cell 38. The polarized beam is rotated vertically (S-polarization) by a half-wave plate 46 in order to have the same polarization as the test beam 24'. Mirrors 48 and 50 direct beam 22 so that it interferes with the test beam 24 at the film plate 37 at an angle $\theta_2$ between the two beams. Hence, the hologram records two wavefronts from the test beam 24 which are separated in time by the pulse spacing. The test path length and the two recording reference path lengths are typically matched to obtain maximum modulation contrast in the hologram.

Although FIG. 1 shows two paths for recording reference beams, it is to be understood that multiple exposures (not separatedly shown) can be made by adding additional sets of Pockel cell, beam splitters and mirrors in a like manner to create additional angularly separated recording reference beams.

The the wavefronts used to produce the interference are stored in the hologram as a latent image. Film plate 37 is then developed to produce the readout hologram. Other recording media such as thermoplastic materials may be utilized in place of silver emulsion film for more rapid processing or development.

The basis for the readout technique utilized by the present invention is heterodyne interferometry. Referring again to FIG. 1, a laser beam 52 from a continuous wave laser source 54 is reflected from a mirror 55 and split into two orthogonally polarized components 56 and 58 by a polarizing beam splitter 60. A half-wave plate 62 is used to control the intensity between these two beams. A pair of Bragg cells 64 and 66 frequency modulate the beams at $\omega_1$ and $\omega_2$. For example, one beam may be modulated at 41 MHz and the other at 42 MHz. Beams 56 and 58 are then incident on mirrors 68 and 70, respectively, recombined using polarizing beam splitter 72 and then expanded by beam expander telescope 74 so that the beams illuminate the full aperture of the hologram on film plate 37.

Polarizing beam splitter 40 then splits the beams. Mirrors 42 and 48 and 50 are used to direct each reference beam 22' and 22" to the hologram at angles $\theta_1$ and $\theta_2$ relative to the test beam 24'. Half-wave plates 76 and 46 are adjusted so both plates transmit S-polarized beams. The two readout reference waves 22' and 22'' produce the original test beam wavefronts stored in the hologram, and the first orders of these wavefronts are aligned to intefere with one another.

When these wavefronts interfere and are detected, the alternating current signal, i, produced as a function time and orthogonal coordinates x and y, is given by:

$$i(x,y,t) = i_o \cos[\Delta\omega t + \phi(x,y,t)] \quad (1)$$

where $i_o$ is the signal amplitude, $\Delta\omega = \omega_1 - \omega_2$, and $\phi(x,y,t)$ is the phase difference between the two wavefronts. In the example cited above with $\omega_1$ equal to 41 MHz and $\omega_2$ equal to 42 MHz, the difference frequency is 1.0 MHz. Such a high difference frequency allows many zero-crossings to be averaged to determine the phase difference at each point (x,y).

Figure 3:
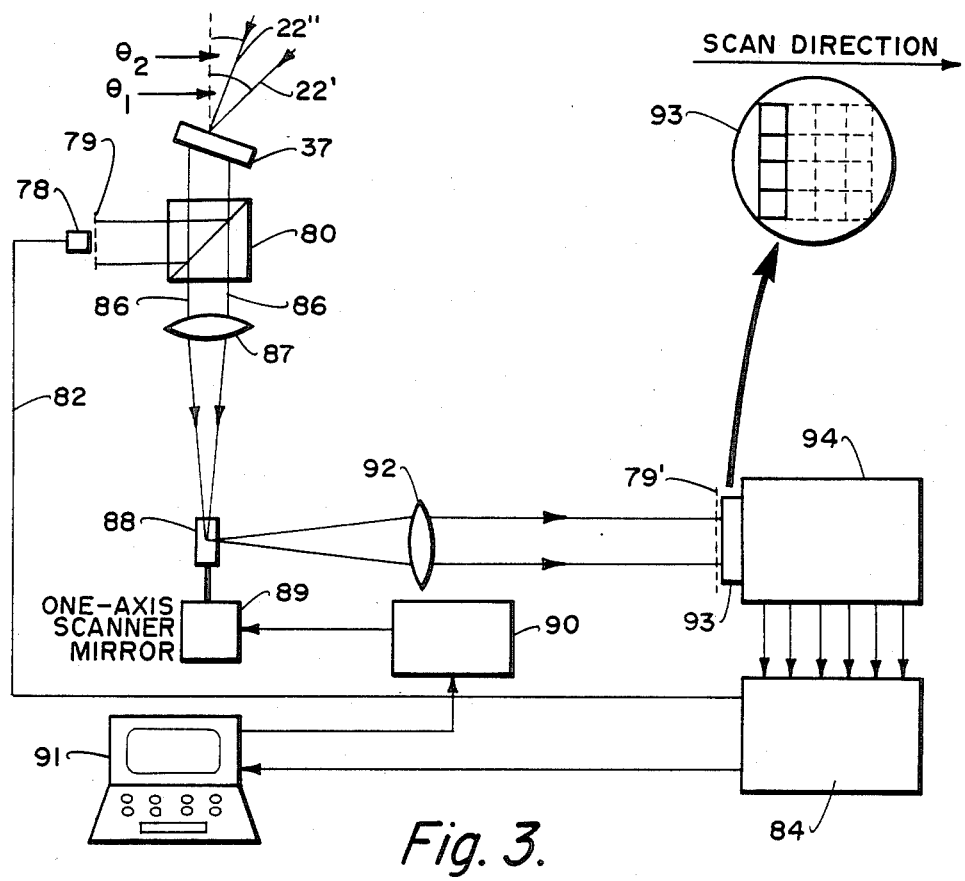
FIG. 3 is a schematic diagram of the apparatus for reconstructing the wavefronts and for scanning across a one-dimensional photodiode array using a one-axis scanner mirror.

Referring now to FIG. 3, part of the wavefronts are directed to a reference photodiode 78 located in an interference plane 79 by a beam splitter 80. The phase difference or optical path difference is measured between a reference location in an interference plane 79 and any other spatial location in an interference plane 79'. The two interference planes 79 and 79' are typically conjugate planes. The photodiode 78 samples the wavefronts at one location in the field and remains stationary during the readout process. All phase measurements are referenced to this location. An output signal 82 from photodiode 78 is a 1.0 MHz sine wave that is inputted into the reference channel of a zero-crossing phase meter 84. A transmitted portion 86 of the wavefronts passes through a one-to-one magnification lens system 87,92. At the focal point 88 of lens 87 is a one-axis scanner mirror 89 which is adjusted by a scanner mirror driver 90 receiving signals from a microcomputer 91. The output beam from the focusing lens 87 is directed through imaging lens 92 toward a one-dimensional photodiode array 93. The readout electronics consist of the linear photodiode array 93, preamplifiers 94 and phase meters 84. The photodiode array 93 is located in interference plane 79'. Each photodiode is hardwired to a preamplifier and connected to a dedicated phase meter and memory. By stepping the mirror 89, the wavefronts are moved across the photodiode array 93 so that the entire field pattern is sampled. At each step, the scanner mirror 89 is allowed time to settle before a phase measurement is recorded. The scanner mirror 89 has been previously calibrated to remove angular positioning errors. The optical signal is detected by each photodiode and sent to a separate preamplifier. The resulting 1.0 MHz sine wave is inputted into a separate test channel of a zero-crossing phase meter 84. Thus, the phase difference between the reference location and each test photodiode location is determined by measuring the phase shift between the two 1.0 MHz sine waves. These phase measurements are stored for each test photodiode sample location. Since a test photodiode and the reference photodiode can be superimposed on each other by scanning the mirror 89, the optical path difference of the entire hologram can be referenced to one location.

As mentioned previously, detecting high spatial frequency fringes from interferograms can cause detection problems with fixed pixel sensors. In the holograms, the steep slopes of the wavefronts must be sampled a minimum of once, somwhat less than every $\pi$ phase change, in order to eliminate $2\pi$ ambiguities. One method to increase the spatial density is to replace the scanner mirror 89 and one-dimensional array with an image dissector camera with pixel densities as high as 1024 by 1024. However, the problem still remains that $2\pi$ ambiguities can exist between the camera pixels.

Figure 4:
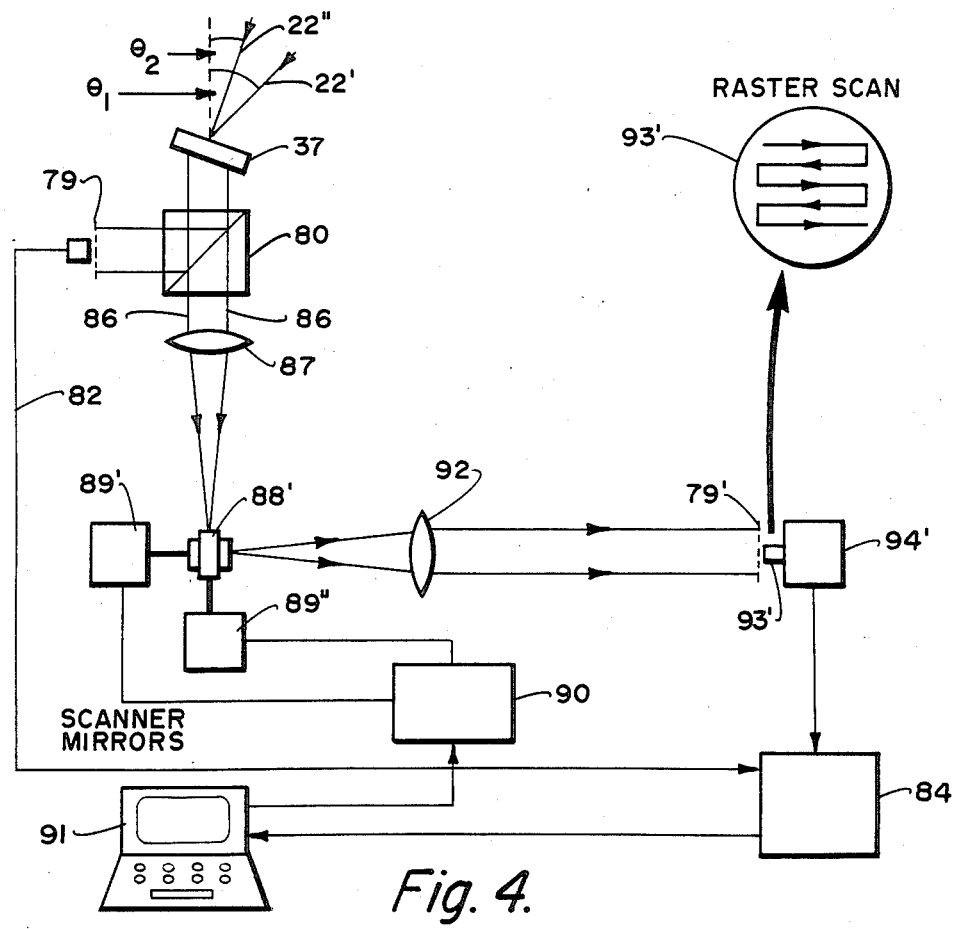
FIG. 4 is a schematic diagram of the apparatus for reconstructing the wavefronts and for scanning wavefronts across a photodiode using two one-axis scanner mirrors.

To minimize this problem, the one-axis scanner mirror 89 in FIG. 3 may be replaced by two one-axis scanner mirrors 89', 89'', one on either side of imaging optics focal point 88', shown in FIG. 4. The axis of one scanner mirror is orthogonal to the other. The one-dimensional detector array 93 is replaced by a single small aperture test detector 93'. By scanning the mirrors, the wavefronts are moved across the detector so the field is continuously sampled in a raster scan manner. The detector aperture must be sized to give the desired phase accuracy with adequate signal-to-noise ratio. This system takes advantage of the fact that the phase meter continually measures the phase difference or optical path difference. With a single photodiode, the optical path difference can be measured and recorded at fixed locations or at the next location where the optical path difference has has changed a fixed amount, say one-half of the wavelength. By keeping track of the location on the hologram, a wavefront with a steep slope (which is equivalent to an interferogram with high frequency fringe) can be conveniently handled. Also, varying "fringe" or modulation contrast across the hologram can be compensated by rotating the half-wave plate in FIG. 1 to optimize the heterodyne signal amplitude $i_o$ in Equation 1. This will allow for a greater dynamic range of modulation contract compared to an interferogram of fixed fringe contrast.

Obviously, many modifications and variations of the present invention are possible in light of the above teachings. Thus, while only two reference beams—recording and readout—have been described, multiple recording and readout beams may be utilized. Also, a variety of hologram recording media may be used. In addition, solid and transparent media may be used in test chamber 34. Further, holograms may be read out using phase modulation in addition to frequency modulation readout techniques. Accordingly, it should be understood that, within the scope of the appended claims, the invention may be practiced otherwise than as specifically illustrated and described.

What is claimed:

1. An apparatus for the recording and readout of multiple-exposure holograms, comprising:

means for producing a multiple-pulsed linearly polarized laser beam;

means for rotating the plane of polarization of said laser beam;

a first polarizing beam splitter for dividing said pulsed laser beam into a test beam and a reference beam after the plane of polarization of said laser beam is rotated, said means for rotating the plane of polarization producing an intensity ratio between the test beam and the reference beam;

means for directing the test beam toward a test medium and then to a recording medium, said means for directing the test beam including means for producing a circularly polarized beam for efficient transmission of the test beam to said recording medium;

at least one means for rapidly and selectively switching the plane of polarization of the reference beam;

at least a second polarizing beam splitter for providing at least a first recording reference beam and a second recording reference beam, said first and second recording reference beams being separated in time, the reference beam divided from the pulsed laser beam being directed into said first and second recording reference beams after its plane of polarization is selectively switched;

means for directing said first recording reference beam and said second recording reference beam toward the recording medium at different angles;

means for rotating the plane of polarization of either the test beam or the recording reference beams to produce identical planes of polarization of the test beam and all recording reference beams whereby at least two holograms are recorded and developed on the recording medium; and means for measuring optical path differences between the recorded wavefronts stored in the holograms.

2. The apparatus of claim 1 wherein said means for producing a multiple pulse linearly polarized laser beam includes a double-pulse ruby laser.

3. The apparatus of claim 1 wherein said means for producing a multiple pulsed linearly polarized laser beam includes a double-pulsed frequency doubled Nd:YAG laser.

4. The apparatus of claim 1 wherein said means for producing a multiple pulsed linearly polarized laser beam includes at least two single pulsed lasers.

5. The apparatus of claim 1 wherein said means for rotating the plane of polarization of said laser beam includes a half-wave plate.

6. The apparatus of claim 1 wherein said means for producing a circularly polarized test beam includes a quarter-wave plate.

7. The apparatus of claim 6 wherein said means for directing the test beam includes a reflective mirror located in the path of the test beam after the test medium so that the test beam is redirected by said mirror back through the test medium, transmitted through the quarter-wave plate, and transmitted back to the first polarizing beam splitter for direction to the recording medium.

8. The apparatus of claim 1 wherein said means for selectively switching the plane of polarization of the reference beam includes at least one Pockel cell.

9. The apparatus of claim 1 further including a beam expander telescope for expanding the linearly polarized laser beam prior to its plane of polarization being rotated.

10. The apparatus of claim 1 further including a beam expander telescope for expanding the test beam prior to its incidence on the test medium.

11. The apparatus of claim 1 wherein said means for measuring optical path differences between the recorded wavefronts stored in the holograms includes:

means for producing a continuous wave readout laser beam;

means for rotating the plane of polarization of said continuous wave readout laser beam;

at least a third polarizing beam splitter for dividing said readout laser beam into at least a first readout reference laser beam and at least a second readout reference laser beam, said means for rotating the plane of polarization producing an intensity ratio between the first readout reference beam and the second readout reference beam;

means for modulating said readout reference beams;

means for directing said readout reference beams toward the recording medium of the same angles as the recording reference beam;

means for adjusting the readout reference beams to have the same plane of polarization as each other thereby producing a frequency modulated interference pattern in the interference plane behind the film plate;

means for spatially sampling the intensity of the inteference pattern in the interference plane; and means for measuring optical path differences between the recorded wavefronts stored in the holograms.

12. The apparatus of claim 11 wherein said means for modulating said readout reference beams is frequency modulating means.

13. The apparatus of claim 11 wherein said means for modulating said readout reference beams is phase modulating means.

14. The apparatus of claim 11 wherein said means for producing a continuous wave readout laser beam includes a dye laser.

15. The apparatus of claim 11 wherein the means for rotating the plane of polarization of said continuous wave readout laser beam includes a half-wave plate.

16. The apparatus of claim 11 wherein the means for frequency modulating the readout reference beams includes at least two Bragg cells.

17. The apparatus of claim 11 wherein the means for directing said readout reference beams toward the recording medium at the same angle as the recording reference beam includes:

means for recombining said readout reference beams into a single readout reference beam after being frequency modulated; and a beam expander telescope for expanding the single readout reference beam after being recombined, the expanded beam directed to be incident on said second beam splitter.

18. The apparatus of claim 11 wherein said means for adjusting the readout reference beams to have the same plane of polarization as each other includes half-wave plates on the path of the readout reference beam prior to their incidence on the recording medium.

19. A method for the recording and readout of multiple exposure holograms, comprising the steps of:

producing a multiple pulsed linearly polarized laser beam;

rotating the plane of polarization of said laser beam;

dividing said pulsed laser beam into a test beam and a reference beam after the plane of polarization is rotated, the rotation of the plane of polarization thereby producing an intensity ratio between the test beam and the reference beam;

directing the test beam toward a test medium and then to a recording medium, the test beam being circularly polarized while being directed, thereby allowing efficient transmission of the test beam to the recording medium;

rapidly and selectively switching the plane of polarization of the reference beam;

directing the reference beam into at least a first recording reference beam and a second recording reference beam, said first and second recording reference beams being separated in time, said reference beam being divided into a first recording reference beam and a second recording reference beam after its plane of polarization is selectively switched;

directing said first recording reference beam and said second recording reference beam toward the recording medium at different angles;

rotating the plane of polarization of the test or recording reference beams such that the plane of polarization of the test beam and all recording reference beams are identical, wherein;

at least two wavefronts of the test subject separated in time are recorded on the recording medium and then developed thereby forming at least two holograms on the recording medium; and measuring optical path differences between the recorded wavefronts at a reference location in an interference plane and any other spatial location in the interference plane.

20. The method of claim 19 wherein a double-pulse ruby laser is used for producing the multiple pulse linearly polarized laser beam.

21. The method of claim 19 wherein a double-pulsed frequency doubled YAG laser is used for producing the multiple pulsed linearly polarized laser beam.

22. The method of claim 19 wherein at least two single pulse lasers are used for producing the multiple pulsed linearly polarized laser beam.

23. The method of claim 19 wherein a half-wave plate is used for rotating the plane of polarization of said laser beam.

24. The method of claim 19 wherein a quarter-wave plate is used for producing the circularly polarized test beam.

25. The method of claim 19 wherein the test beam is directed to the recording medium by first directing it from the first polarizing beam splitter through a quarter-wave plate, then through the test medium, then reflecting it from a reflective mirror back through the quarter-wave plate, and then back to the first polarizing beam splitter which directs its finally to the recording medium.

26. The method of claim 19 wherein a Pockel cell is used for selectively switching the plane of polarization of the reference beam.

27. The method of claim 19 further including a beam expander telescope for expanding the linearly polarized laser beam prior to its plane of polarization being rotated.

28. The method of claim 19 further including a beam expander telescope for expanding the test beam prior to its incidence on the test medium.

29. The method of claim 19 wherein the step of measuring optical path differences between the recorded wavefronts includes the steps of:

producing a continuous wave readout laser beam;
rotating the lane of polarization of said continuous wave readout laser beam;
dividing said readout laser beam into at least a first readout reference laser beam and at least a second readout reference laser beam, the rotation of the plane of polarization thereby producing an intensity ratio between the first readout reference beam and the second readout reference beam;
frequency modulating said readout reference beams;
directing said readout reference beams toward the recording medium at the same angles as the recording reference beams;
adjusting the readout reference beams to have the same plane of polarization as each other thereby producing a frequency modulated interference pattern in the interference plane behind the recording medium;
spatially sampling the intensity of the interference pattern in the interference plane; and
measuring optical path differences between the recorded wavefronts measured relative to a reference location in the interference plane.

30. The method of claim 19 wherein the step of measuring optical path differences between the recorded wavefronts includes:

producing a continuous wave readout laser beam;
rotating the plane of polarization of said continuous wave readout laser beam;
dividing said readout laser beam into at least a first readout reference laser beam and at least a second readout reference laser beam, the rotation of the plane of polarization thereby producing an intensity ratio between the first readout reference beam and the second readout reference beam;
phase modulating one of said readout reference laser beams;
directing said readout reference beams toward the recording medium at the same angles as the recording reference beams;
adjusting the readout reference beams to have the same plane of polarization as each other thereby producing a phase modulated interference pattern in the interference plane behind the recording medium;
spatially sampling the intensity of the interference plane; and
measuring optical path differences between the recorded wavefronts measured relative to a reference location in the interference plane.

* * * * *